Nov. 25, 1930.   E. V. MYERS   1,782,580
VALVE FOR PNEUMATIC TIRES OR THE LIKE
Filed April 7, 1923

INVENTOR
Eugene V. Myers,
By Attorneys,
Fraser, Burk & Myers

Patented Nov. 25, 1930

1,782,580

UNITED STATES PATENT OFFICE

EUGENE V. MYERS, OF EAST ORANGE, NEW JERSEY, ASSIGNOR TO A. SCHRADER'S SON, INCORPORATED, OF BROOKLYN, NEW YORK, A CORPORATION OF NEW YORK

VALVE FOR PNEUMATIC TIRES OR THE LIKE

Application filed April 7, 1923. Serial No. 630,480.

This invention relates to valves for pneumatic tires or the like, and aims to provide certain improvements therein.

The standard valve of the present time comprises a shell or casing and working parts or so-called insides, which comprise essentially a seat opening downwardly, a packing for making a tight joint between the seat and the casing, and a valve proper or check for cooperating with the seat. There thus exists two possible points of leakage, namely, between the seat and the casing and between the check and the seat. It has heretofore been proposed to construct a valve casing having an integral seat, whereby one source of leakage is eliminated. In most prior constructions this has necessitated the passing of the check in through the bottom of the valve, thus preventing the change of valve checks in case of injury except by removal of the valve from the tire tube. This type of valve has long been known as a bottom repair type of valve, and its use has been largely discarded. It has also been proposed to provide a valve casing having an integral seat with means for introducing the check through the top of the valve and means for removing it therefrom in case of the necessity of replacement. Such valves conform to the standard practice in the sense of being top repair valves, but are so complicated as to be difficult to use in connection with valves of the necessarily small dimensions required for automobile tires, and in addition have been expensive to manufacture and difficult to operate.

The object of the present invention is to provide a top repair valve having an integral seat (or a seat which does not require to be removed, such seats being included in the term "integral seat" as used herein), which valve shall be cheap and simple to manufacture, easy to replace, and well adapted to the dimensions of tire valves.

According to one form of the invention, I provide a valve with an integral seat and with a check which is adapted to be passed through the top of the valve to insert it to a point below the seat. Means are provided for holding the valve in a range of working positions, and when it is desired to renew the valve, the one already in place is pressed downwardly to a point in the interior of the valve out of the range of working positions, and a new check is inserted through the top. In this form of the invention the discarded checks simply remain in the valve casing, which being elongated has sufficient capacity, if properly constructed, to receive a number of such checks without interfering with the functioning of the valve. In ordinary practice it is seldom that more than two or three valve checks are required to be used in connection with a single casing, but preferably the interior of the valve is so constructed as to receive a considerably greater number. In this form of the invention the check itself is exceedingly simple and very cheap to manufacture, so that it may be sold at so low a price that it is cheaper to insert a new inside or check than to attempt to examine or repair one already in place.

According to another form of the invention, I provide a valve in which the check is inserted as before, but which is provided with means whereby it can be removed from the interior of the casing by the exercise of sufficient force which is greater than that to which the valve can be subjected in use.

If desired, the check provided in the latter form of the invention can be so constructed in connection with the casing that it shall have the capacity of either being pushed inwardly, as in the first form, so that the user can press the check inwardly out of the way, or remove it from the top of the casing, as he desires.

In the drawings, wherein I have shown several forms of the invention,—

Figures 1, 7, 8:
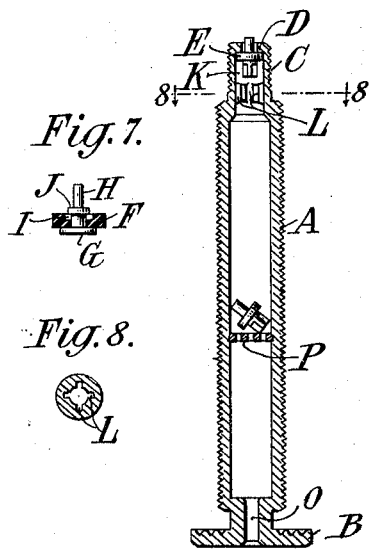
Figure 1 is a diametrical section of one form of the invention applied to a casing of the standard dimensions.
Fig. 7 is an enlarged view of one form of check provided by the present invention, and showing the interior construction.
Fig. 8 is a section on the line 8—8 in Fig. 1.
Figure 12:
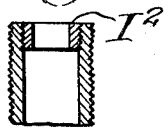
Fig. 12 is a detail of a modified form of seat.

Referring first to Fig. 1, let A indicate a valve casing having the usual foot B clamping against the inner tube, and a nipple C for connection with a valve cap or pump coupling. The proportions illustrated are substantially those of the standard valve. At the top of the nipple C is formed an internal valve seat D. This valve seat is preferably made integral in the sense of being formed of the same metal, although, as before explained, this term is used to indicate a more or less permanent seat which is not necessary to remove in order to remove the check, such as the screw threaded seat $E^2$ of Fig. 12, for instance. E is a valve check or valve proper which may be formed as illustrated in Fig. 7. In this figure it comprises a packing washer F, a base G, and a deflating pin H. Preferably the packing washer has moulded within it a thin metal disk I, and preferably also the pin has a shoulder J overlying the disk. This assures a firm connection between the washer and the pin. The packing washer F is of sufficient external diameter to extend beyond the seat D when the check is inserted into the valve chamber K (Fig. 1). The insertion may be accomplished by pressing the check through the open end of the seat, in which operation the washer will cup or bend around its circumference, so as to permit its passage through the seat. Preferably the base G is of a diameter which will just pass through the seat. When the check is in the valve chamber, the packing washer is hence prevented from cupping in the opposite direction, so that the check will not blow out due to internal pressure in the tire. When once inserted, the valve functions as an ordinary check, and may be permitted to remain in position until it is required to be replaced.

In connection with the check, I preferably provide some means by which it will be kept in the range of working positions. This is preferably a shoulder, such as L, (Fig. 1) which, however, is cut or slotted as is illustrated in Fig. 8, so that when the check moves down upon the shoulder, free space will be permitted around the check into the interior of the valve.

When it is required to replace the inside, the latter is forced downwardly away from its seat and another check inserted in the top of the valve. Thereafter the check last inserted will function as the working insides, and that first used will remain idly in the interior of the valve. When a shoulder, such as L, is used, the original check is pressed through the space enclosed within it in a manner which is similar to that employed in originally inserting the check, and thereafter the original check is prevented from moving into the range of operation of the succeeding check. The slotted construction of the shoulder will prevent the second check functioning as a valve, although in certain cases there is no especial detriment to permitting it to function as much as its damaged condition will admit. Preferably, however, it is taken out of the range of action and dropped into the interior of the valve casing.

Figures 2, 9:
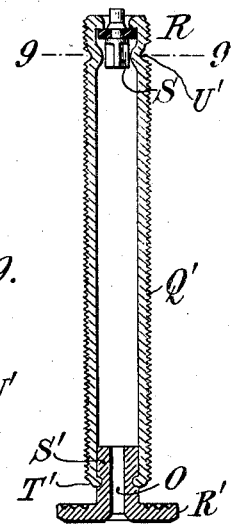
Fig. 2 is a similar construction applied to a valve of the standard body dimensions, but omitting the customary nipple.
Fig. 9 is a section on the line 9—9 of Fig. 2.

I prefer to construct the valve insides and proportion the dimensions of the valve chamber, so that the pressing in of a second inside will press out the first through the shoulder. The shoulder may be formed in several ways, as for instance by a cutting operation; or by pressing in the metal of the valve at a plurality of points, as illustrated in Fig. 9.

Figures 5, 10:
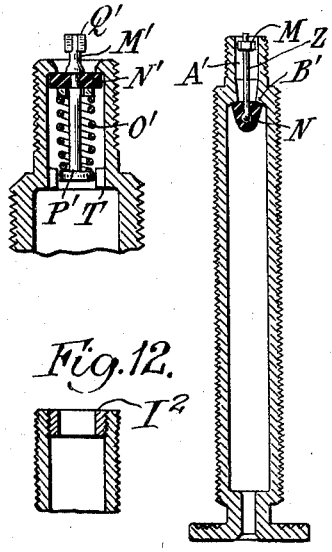
Fig. 5 is a similar view of another modification.
Fig. 10 is a section of another form of the invention.

Instead of the shoulder, I may adopt the construction of Fig. 5, wherein the valve pin is provided above the seat with a collar M, which is cut away or indented on its periphery, so that air will pass through it, the collar M being made of a material such as somewhat hardened rubber or lead, which under normal pump pressures will prevent it blowing through into the interior of the valve, and yet will permit its being pressed either by the use of a tool, or by hand. This construction provides the valve (N in Fig. 5) with a means for keeping it within a working range, and yet permits its forcible movement beyond such range when desired.

Figure 3:
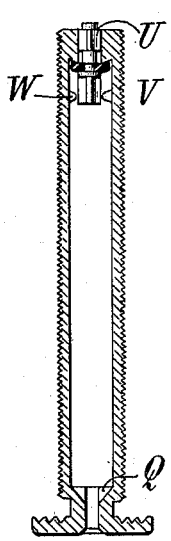
Fig. 3 is a similar view of a slightly modified form.

When the discarded valves are pressed down in the interior of the casing, they are simply held idle, air being able to pass them in both directions. I provide a means by which they will not choke the passage O (Fig. 1), such means being in that figure shown as a perforated stop or grid P. In Fig. 3 I have illustrated at Q a construction in which a part on the lower portion of the valve is cut away, leaving ribs which will provide a passage for the air even though a valve check should impinge directly against it.

As thus constructed, the valve check may be made very cheaply, and is capable of easy replacement from time to time, the checks which have been pressed into the interior of the valve merely lying idle without detriment.

In Fig. 2 I have shown a construction in which the valve check R is provided with a ribbed guiding tail S, which performs the function of guiding the valve in its operative movements, and which also prevents the valve from assuming a position wherein it will close the passage O when the check has been discarded and lies in the interior of the valve.

In Fig. 3 I have shown a construction in which a check is provided with two such tails U and V respectively, one of which is arranged above the packing washer and the other below, the uppermost tail coacting with the passage leading to the seat and the lowermost tail coacting with the shoulder W.

Figure 4:
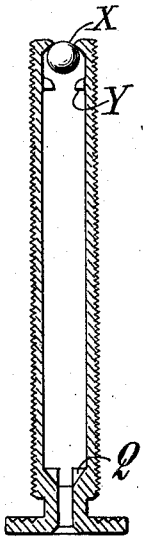
Fig. 4 is a similar view of another modification.

In Fig. 4 I have shown a very simple form of the invention which comprises a ball formed of rubber or other suitable material, and which acts as the check. This is compressed in passing through the seat X, and is normally held in a working range by the shoulder Y or its equivalent.

In Fig. 5 I have shown a body of compressible material N which constitutes the check, and which is mounted on a pin Z. The check N is preferably tapered, as is also the bore A'. By pressing the check N inwardly, it will pass the tapered bore and assume a condition beneath it which will form an effective contact with the seat B'. As previously explained, I prefer in this construction to utilize a stop of compressible material M which has openings or notches within it so as to permit air to pass through when the part N contacts with the tapered bore during the act of inflation or deflation. The stop M can, however, be forced thru the seat, and the check held inactive.

Figure 6:
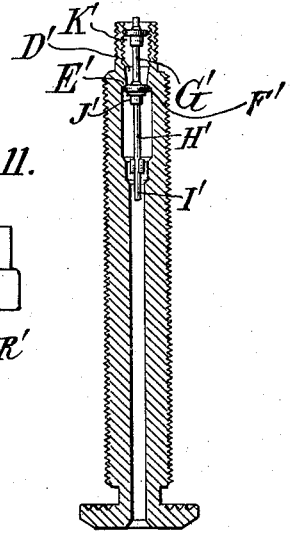
Fig. 6 is a view of a standard valve casing arranged for the reception of the standard valve insides, and showing the application of the present invention thereto.

In Fig. 6 I have shown a standard valve casing adapted to fit a standard inside. The present invention is applicable to such standard casing. The latter is customarily provided with an enlarged chamber C' beneath the tapered seat D', which in the standard construction serves as a shoulder against which the packing washer on the standard seat member contacts. Between the two is a shoulder E' which serves as a valve seat for the check of the present invention. In Fig. 6 the check is shown as having a packing F' mounted on a pin G', the pin below it having an extension H' which is provided with an enlarged end portion I'. The check may be constructed similarly to Fig. 7, with a plate portion J' designed to support the packing.

In Fig. 6 I have also shown a check member which is adapted for use with either the standard valve or the valve of Figs. 1 to 3, for instance. While the same check could be used in the standard valve as indicated in Fig. 1, it would be difficult to reach the pin for deflating or gauging purposes, and for this reason I provide the pin G' which extends to the top of the standard valve, and which also preferably carries a second check K'. This second check is not in use in the standard valve, but when introduced into a valve of the type of Figs. 1 to 3, it comes into play, and the lower check F' does not function. For purposes of interchangeability, the second check K' may be omitted, and simply a long pin G' used; under these circumstances when a check is to be applied to the constructions of Figs. 1 to 3, for instance, the excess portion of the pin can be cut off, so that it meets the standard requirements as to gauging or deflation.

In Fig. 10 I have illustrated that portion of the invention which permits the inside to be removed by forcibly pulling it out of the valve casing. In this construction a pin M' is provided, which is fastened to a packing N', and below the packing is a supporting plate, such as G, in Fig. 7, which supporting plate, however, is adapted to slide up and down the lower extension of the pin M'. A spring O' is interposed between the plate and a shoulder P' formed on the lower end of the pin.

In this construction the valve is inserted by pressing it through the valve seat from the top, and when it is desired to remove the valve from the casing, the pin is grasped, and the device forcibly removed through the seat. During this operation the packing flexes downwardly, the plate sliding along the lower extension of the pin, and permitting the packing to cup sufficiently to enable it to be pulled out of the casing. When the valve is in working condition, however, the spring O' presses the plate up against the packing with considerable force, so that the ordinary pressures within the tire will not bend or buckle the packing.

Figure 11:
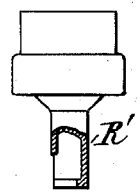
Fig. 11 is a view of a form of cap suitable for the construction of Fig. 10.

In order to facilitate the removal of the inside, I prefer to provide a head Q' on the pin which is adapted to be engaged by the projection R' on the valve cap, shown in Fig. 11, so that the user can connect the cap with the pin, and use the valve cap as a handle or tool to forcibly pull the inside through the seat.

Fig. 10 also illustrates a construction in which the action set forth with regard to the prior structures herein shown can take place, namely, the pushing of the inside downwardly out of working position past the shoulder, such as T'. In this construction if the user wishes to remove the inside, he can do so through the top, or if he wishes, he can push the old inside past the shoulder T' and insert a new inside.

The construction of Figure 2 illustrates a very cheap and efficient form of valve. In this structure the body portion Q' of the valve may be formed of seamless tubing, and the foot portion R' may be formed by either drawing, or otherwise, and the two connected. The joint may be made, for instance, by forcing one part into the other, the neck S' of the foot portion being tapered and the body portion having a similar taper, if desired. Preferably the neck portion is formed with a groove T' into which the end of the body portion is swaged, as shown. The abutment U' is preferably formed by indenting the metal from the outside, as heretofore described.

While I have shown and described several forms of the invention, it will be understood that I do not wish to be limited thereto, since various changes may be made therein without departing from the spirit of the invention.

What I claim is:—

1. A valve for tires or the like, comprising a casing having an integral seat, a check adapted to be passed through the top of said valve to a point below said seat, means for preventing blowing out of said check, and a shoulder below said seat past which said check may be forced to a non-working position with relation to said seat.

2. A valve for tires or the like, comprising a casing having an integral seat, a deformable check insertable in said casing through the top thereof, a shoulder below said seat defining an opening, a guide fixed to said check for cooperating with the opening in said shoulder, said check being adapted to be pushed through said opening and to be replaced by inserting a second check through the top of the casing.

3. A valve for tires or the like, comprising a casing having an integral seat, a check adapted to be inserted through the top of said valve, means for holding said check in working position, and means below said seat for confining said check in non-working position within the casing, said last-named means comprising a part having an opening which said check cannot close.

4. A valve for tires or the like, comprising a casing having an integral seat, a check comprising a deformable element adapted to be inserted through the top of said valve to a position where it cooperates with said seat, means for normally confining said check within a working range of movements, said casing having below said seat a capacity for a plurality of checks, the check being adapted to be moved past the means for confining the check within its working range of movements to a position within the casing below the seat and to be replaced by inserting a second check through the top of said valve.

5. A valve for tires or the like, comprising a casing having an integral seat, a check comprising a deformable element adapted to be inserted through the top of said valve to a position where it cooperates with said seat, means for normally confining said check within a working range of movements, said casing having below said seat a capacity for a plurality of checks, the check being adapted to be moved past the means for confining the check within its working range of movements to a position within the casing below the seat and to be replaced by inserting a second check through the top of said valve, and means for holding all except the last check in non-working position relatively to said seat.

6. A valve for tires or the like, comprising a casing having an integral seat, a check comprising a deformable element adapted to be inserted through the top of said valve to a position where it cooperates with said seat, a shoulder below said seat in cooperation with which the working range of movements of the check is defined, said casing having below said shoulder a capacity for a plurality of said checks, the check being adapted to be moved past the shoulder to a position within the casing below said shoulder and to be replaced by inserting a second check through the top of said valve, and means for holding all excepting the last check in non-working position relatively to said seat, said means comprising said shoulder within the casing below said seat.

7. A valve for tires or the like, comprising a casing having an integral seat, a deformable check adapted to be inserted through the top of said valve to a position below said seat where it normally cooperates with said seat, and adapted upon being subjected to abnormal inward pressure to be further moved to an inactive position below said seat, means for holding said check in said inactive position below said seat, and means for limiting the movement of said check in the latter position.

8. A valve for tires or the like, comprising a casing having an integral seat, a deformable check adapted to be passed through the top of said casing to a position beneath said seat where it normally cooperates with said seat, and adapted upon being subjected to abnormal inward pressure to be further moved to an inactive position below said seat, means for holding said check in said inactive position and said check having at its top and bottom parts acting as guides for said check.

9. A valve for tires or the like, comprising a casing having an integral seat, a deformable check adapted to be passed through said seat to a point below the same and a stop formed integrally with the metal of the casing below said seat for limiting the normal inward movement of the check, said stop defining an opening through which the check can be passed when it is subjected to abnormal inward pressure.

10. A valve for tires or the like, comprising a casing having an integral seat, a deformable check which can be passed through said seat from the top to a position where it cooperates with said seat, means for normally confining said check within a working range of movements, and said check and casing being so constructed that the check can be passed inwardly from its normally confined working position relatively to said seat to an idle position.

In witness whereof, I have hereunto signed my name.

EUGENE V. MYERS.